April 29, 1952 M. E. MOHR 2,594,336
ELECTRICAL COUNTER CIRCUIT
Filed Oct. 17, 1950 2 SHEETS—SHEET 1
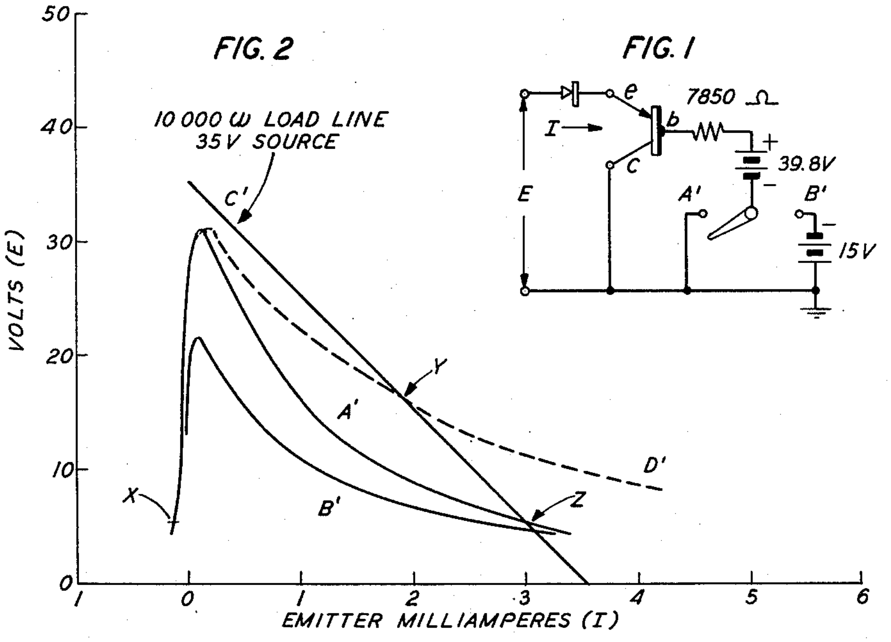
FIG. 2, FIG. 1
FIG. 3A
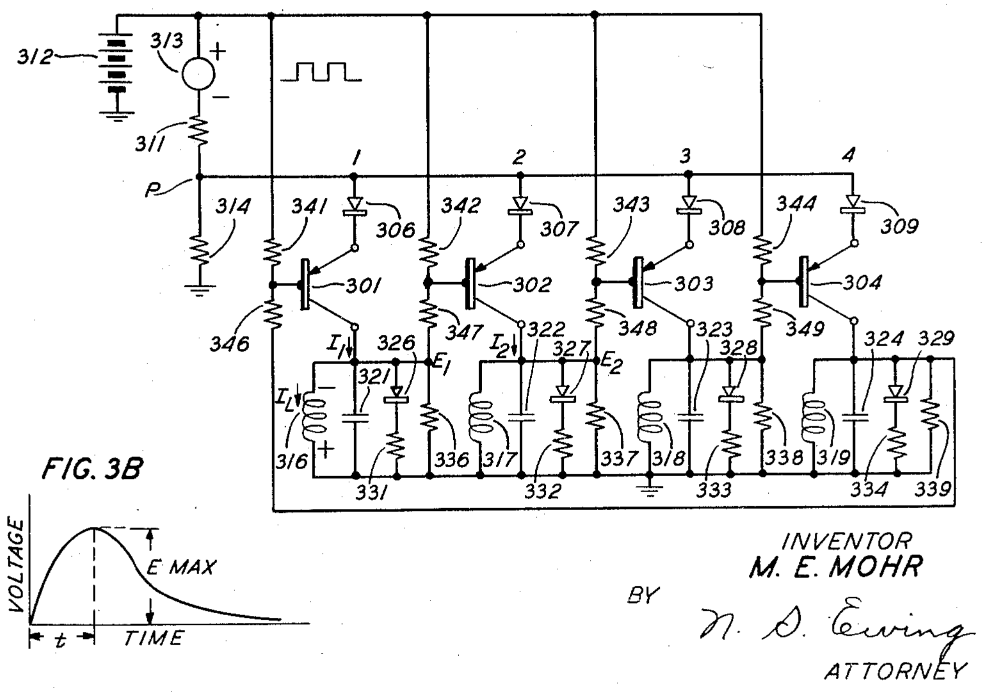
FIG. 3A, FIG. 3B
INVENTOR
M. E. MOHR
BY N. S. Ewing
ATTORNEY April 29, 1952 M. E. MOHR 2,594,336

ELECTRICAL COUNTER CIRCUIT

Filed Oct. 17, 1950 2 SHEETS—SHEET 2

INVENTOR
M. E. MOHR
BY N. D. Ewing
ATTORNEY

Patented Apr. 29, 1952

2,594,336

UNITED STATES PATENT OFFICE 2,594,336

ELECTRICAL COUNTER CIRCUIT

Milton E. Mohr, Pacific Palisades, Calif., assignor to Bell Telephone Laboratories, Incorporated, New York, N. Y., a corporation of New York Application October 17, 1950, Serial No. 190,571

10 Claims. (Cl. 171—97)

This invention relates in general to double stability circuits of the type which employ as their active elements units having a negative resistance characteristic, and more specifically to ring counter circuits employing transistors as their active negative resistance elements.

As used in the specification and claims hereinafter the term "ring counter" means a circuit comprising a plurality of stages, each of which has more than one state of stability and wherein each of the stages advances from one state of stability to another in regular or irregular timed relation under control of impulses applied to the circuit.

In certain applications, such as pulse code modulation systems, in which a series of operations is performed recurrently, a ring counter circuit functions as the timing or control mechanism for impressing a pulse on each of a plurality of output circuits in sequence.

A general object of this invention is to improve the dependability of ring counter circuits.

A more specific object of the invention is to provide a ring counter circuit including transistors in which the operating adjustments are less critical than in prior art circuits of a similar type.

In application Serial No. 164,362, filed jointly by J. O. Edson and J. G. Kreer on May 26, 1950, a ring counter circuit is disclosed which is characterized by the use of a plurality of current-conducting paths or current meshes, in each of which current flows continuously but in unequal amounts. Each of these paths employs a two terminal variable resistance element characterized by a voltage-current characteristic which varies through a first region of positive resistance and a second region of positive resistance, separated by an intervening region of negative resistance or instability.

In the circuit embodiments disclosed by Edson and Kreer in the above-identified application for patent, each two-terminal negative resistance unit is associated with an additional impedance element, the value of which is chosen such that the region of negative resistance is unstable, whereby the current flowing in one branch of the ring circuit is always larger than that flowing in the remaining branches, and of such a magnitude, that the one variable resistance conducting path is operated in its upper region of positive resistance, while the others are simultaneously operated in their lower region of positive resistance.

Each of the aforesaid circuit meshes is interconnected with the next adjacent mesh of the ring circuit through a "memory" or storage circuit which stores energy in accordance with a difference in current flow between two adjacent variable resistance units. A pulsing mechanism periodically forces all of the variable resistance units to momentarily operate in their lower positive resistance region, thereby promoting redistribution of the energy stored on both sides of the high-current branch, and causing a revision of the current-conduction states in the variable resistance units. Each of the aforesaid "memory" or storage circuits includes a unidirectional current-conducting element which is poled to determine the counting direction of the ring by controlling the direction of distribution of the stored energy from one mesh to the next adjacent mesh, whereby the previously high-current branch becomes a low-current branch, and the next adjacent branch in the stepping direction conducts high current. This revised current condition prevails until a second disturbance again promotes another energy redistribution and another current-conduction revision, whereupon the high-current condition moves around the ring another stage in the selected direction.

In accordance with the present invention, an improved form of ring counter employing transistors as variable resistance units is provided by connecting a number of transistor stages in cascade as four-poles with the emitters connected in parallel to a single pulsing source and the collector of each transistor connected to the base of the next adjacent transistor through a critically damped storage circuit.

Each pulse from the negative pulsing circuit produces a broad negative pulse in the critically damped storage circuit of the high-current conducting transistor, which is impressed on the base electrode of the next adjacent stage, thus reducing the peak voltage of the characteristic associated with this transistor so that when the pulse terminates, this particular transistor will reach its peak voltage before any of the others, and will conduct a large amount of current, thereby taking control from the preceding unit.

Such a circuit has a number of advantages over ring circuits of the type previously described, in that it operates with greater stability, with lower critical operating adjustments on the various components, and over a wider range of frequencies.

Other features and objects of the invention will be apparent from a detailed study of the specification and the attached drawings, in which:

Fig. 1 is an idealized circuit schematic utilized in the theoretical discussion;

Fig. 2 is a graphical representation of the negative resistance characteristic of transistors, under various conditions of operation;

Fig. 3A is a ring counter circuit in accordance with the present invention;

Fig. 3B shows an operating characteristic of the system;

Figure 4:
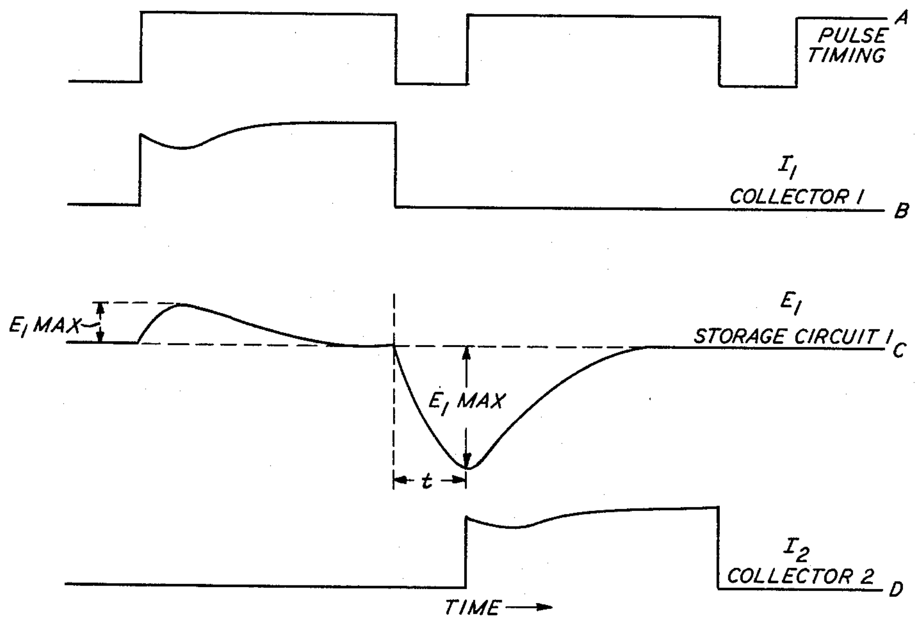
Fig. 4 is an idealized representation of voltage and current variations in various parts of the transistor circuit shown in Fig. 3.

The basic negative resistance circuit which serves as a building unit of the ring circuit of the present invention is shown in Fig. 1. This includes a semiconductor triode of the type commonly known in the art as a "transistor," which is described and claimed in Patent 2,524,035 issued to J. Bardeen and W. H. Brattain on October 3, 1950. Each of these units comprises a small block of semiconductor material, such as N type germanium, with which are associated three electrodes. One of these, known as the base electrode, which may take the form of a plated metal film, makes low-resistance contact with one face of the germanium block. The other two electrodes, termed the "emitter" and "collector" electrodes, preferably make point contact with the other face of the block.

In the circuits of the present invention, each of these units is connected so that the resistance between the base electrode and ground is high relative to the resistance between the emitter electrode and ground. Under these conditions, as described in application Serial No. 58,685, of H. L. Barney, filed November 6, 1948, now Patent No. 2,585,078, the transistor is characterized by a ratio of short-circuit collector current increments to corresponding emitter current increments which substantially exceeds unity for electrode current-voltage conditions within a preassigned range of values, whereby a voltage-current characteristic is produced which has a negative slope within certain limits, such as indicated by curve A′ of Fig. 2.

Referring to the illustrative circuit of Fig. 1, a large resistance, having a value of 7,850 ohms, is included in the base circuit, which is connected to the positive terminal of a 39.8-volt battery, the negative terminal of which is connected to the contactor of a single-throw-double-pole switch. One contact A′ of the switch is connected directly to ground; and the other contact B′ is connected to the negative terminal of a 15-volt biasing battery. A diode rectifier is connected in the emitter circuit.

Consider first the situation which obtains when the switch is thrown to position A′ of the switch. A typical static voltage-current characteristic obtained, as indicated by curve A′ of Fig. 2. The inclusion of the diode serves to make the curve to the left of the origin steep, which is of particular importance when it is desired to combine a large number of stages to form a ring circuit. Conversely, it has been found that if the diode is not included in the circuit, some types of transistor units will have a very low slope to the left of the origin.

To a rough approximation it has been found that the voltage of the battery in the base circuit determines the voltage peak of the characteristic, and the value of the resistance in the base circuit determines how quickly the characteristic saturates and reaches the low voltage value.

Assume first, that the switch is thrown to contact B′, reducing the peak voltage. It is seen that curve B′ which is plotted to represent this condition, shows a reduction of about ten volts from the peak voltage of curve A′.

Assume further that two stages such as indicated in the A′ connection of Fig. 1 are connected in parallel through their emitters to a 10,000-ohm load and a 35-volt source of potential. The load line is indicated by a straight line C′ of Fig. 2. The dotted line D′ represents the composite characteristic of the two transistors connected in parallel. Hypothetically, there appears to be an intersection between curves C′ and D′ at point Y. However, since the region of negative slope is a region of circuit instability, the steady state intersection with the load line will occur at point Z for one of the units, and at an equivalent voltage point X in the positive resistance, low current part of the characteristic for the other unit. The same argument will hold true if more than two of these units are paralleled, the result being that only one, in any case, is conducting at any one time.

In order to form a ring circuit in accordance with the present invention, four of the type circuits described with reference to Fig. 1 are connected in tandem with their emitter circuits in parallel. Such a circuit is shown in Fig. 3 of the drawings which includes transistors 301, 302, 303, and 304. Each of these transistors is of the type disclosed and claimed in Patent 2,524,035 to J. Bardeen and W. H. Brattain, supra; and they are each connected in circuit relation with a base resistance which is high relative to the resistance of the emitter circuit, thereby producing a characteristic operation having a region of instability or negative resistance, in the manner disclosed by H. L. Barney in application Serial No. 58,685, supra.

In the emitter circuit of each of these transistor stages is connected one of the diode rectifiers 306, 307, 308 and 309. These are paralleled to a circuit which, in the present illustrative embodiment, includes a 150-volt potential source 312 and a resistor 311 of 42,900 ohms, operating effectively at point P as a potential source having an internal voltage of 35 volts and an internal impedance of 10,000 ohms, such as described with reference to the idealized circuit of Fig. 1. The potential source 312 and the resistor 311 are connected in series relation with a conventional generator of square-topped pulses 313, which in the present illustrative example produces pulses having a duration of ten microseconds and is so poled with reference to source 312 that the recurring pulses intermittently reduce the potential at point P. The junction P between the resistor 311 and the common connecting point of the diodes 306, 307, 308, and 309 is connected to ground through a resistor 314, which in the presently described embodiment has been assigned a value of 13,000 ohms.

An important feature of the present circuit is the coupling or storage circuit which is connected between the collector electrode of one stage and the base electrode of the next succeeding stage. This comprises between each two stages a capacitor connected in parallel with an inductor and additional branches including a rectifying element, and damping resistance. In a preferred arrangement, the L, C and R values are so chosen that when the condenser discharges through the inductance and resistance branches of the circuit, a condition approximating critical damping results, whereby the voltage across the parallel circuit reaches its negative peak just as each pulse from the pulsing circuit subsides.

In the present application and the appended claims, the term "critical damping" relates to that condition in which sufficient resistance is present in the circuit to provide for an aperiodic rise and fall of voltage across the storage circuit, which approximates the form indicated in Fig. 3B of the drawings. For optimum operation, it is desirable for the voltage $E_{max}$ across the parallel circuit to reach a maximum value in an interval which equals the width of the applied rectangular pulse, which preferably has a period of duration $T=\sqrt{LC}$ or $2RC$, where L and C respectively represent the values of inductance and capacitance of the circuit, R is a lumped value representing the resistance of the various circuit elements applied in shunt across the LC circuit.

In the present illustrative example, each storage circuit comprises one of the inductors, 316, 317, 318 or 319 to each of which has been assigned a value of 0.144 henry, in parallel with one of the capacitors 321, 322, 323, or 324, to each of which has been assigned a value of 485 micromicrofarads.

A value of the order of 11,000 ohms has been assigned to each of the resistors 336, 337, 338, and 339, connected across the L-C circuit, which serves as stabilizing resistances to pad out the variation in each of the base resistances resulting from differences in the parameters of the individual transistors used. In order to prevent a large build-up of positive voltage during the charging period an additional circuit branch is provided in shunt across the L-C circuit which includes a diode rectifier 326, 327, 328, or 329, in series with a corresponding resistance element 331, 332, 333, or 334, the latter of the order of 3,400 ohms. The diodes 326, 327, 328, and 329 are in a conducting direction during charging of the respective condensers, and in a non-conducting direction when the voltage across the L-C circuit becomes negative, thus providing a low resistance shunt during the charging period, and a high resistance during the discharge period.

Connection is made from the junction between the positive terminal of the potential source 312 and the positive terminal of the pulse source 313 to each of the base electrodes through the respective resistors 341, 342, 343, and 344; and between each of the base electrodes and the storage circuit of the preceding stage through the respective resistors 346, 347, 348 and 349. The values of these resistors is so chosen as to provide the proper equivalent base resistance and equivalent base voltage for each transistor. It is apparent that the particular values used would depend on the internal constants of the various transistors used. Typical values are as follows:

Stage 1: 341=38,500 ohms; 346=14,400 ohms
Stage 2: 342=34,000 ohms; 347=13,000 ohms
Stage 3: 343=16,000 ohms; 348= 6,700 ohms
Stage 4: 344=30,000 ohms; 349=11,000 ohms.

Assume, for the moment that transistor 301 is conducting at high current. Under this condition, the intersection of the load line, as shown in Fig. 2, will be at point Z. Therefore, the voltage existing across the other transistors will assume the relatively low voltage, 5 or 6 volts, of this emitter to ground. It is thus seen, that except for transients there is a large margin between the peak voltage which would determine the operating points of the other transistors and the voltage at point Z. Accordingly, instead of a few volts being available for an operating margin, this circuit provides an operating margin of some twenty-five volts. Most of the current flowing into the emitter of transistor 301 will flow out through the collector. This is indicated as $I_1$. If, for the moment, it is assumed that sufficient time has elapsed, nearly all this current $I_1$ will flow to ground through the inductor 316. Now, assume that a negative pulse from the source 313 occurs cutting off the current $I_1$. A voltage will now appear across the inductor 316 in such direction as to tend to make the current continue to flow in the direction it had been flowing. This results in a potential appearing across the inductor 316 which is of polarity as shown in Fig. 3. This polarity voltage causes the diode 326 to be in the non-conducting direction. As pointed out above, in preferred form, the circuit is so designed that the resistance 336 and the resistances in the following base circuit are of such values as to approximate the condition of critical damping in the tuned circuit, the voltage across the inductor reaching its negative peak coincident with the time at which the pulses subsides and the voltage is reestablished on the common point of the transistors.

Again referring to Fig. 1, it is there shown that if a negative voltage is introduced into the base circuit of the transistor, a characteristic such as B' is measured in which the peak voltage is considerably reduced from that which exists when the negative voltage is not present. This is the condition which exists on the base of the transistor 302 in the second stage of the ring circuit during the pulse interval following conduction in stage 1. That is, a relatively large negative voltage is introduced into the base circuit of the transistor 302 which serves to reduce the peak voltage of its associated characteristic. Thus, when the voltage at the common point is reestablished at the end of the pulse, transistor 302 will reach its peak voltage before any of the others and will conduct large currents, thereby taking control. When the current $I_2$ in transistor 302 begins to flow, it finds a discharged condenser 322. Accordingly, at the first instant no voltage is developed at the point $E_2$. However, the voltage at $E_2$ will increase positively as the condenser 322 charges. Finally, as all the current flows through the inductor 317, the voltage $E_2$ will again reduce to zero.

It is important that the voltage on the collector of transistor 302 should not become too large during the build-up transient of current $I_2$, since the voltage to ground existing at the emitter of transistor 302 is increased by whatever voltage exists on the collector, thereby reducing the 25-volt margin against falsely operating another unit. The positive peak of the voltage $E_2$ is minimized in the present arrangement by a low resistance shunt which is connected during the charging interval. This is accomplished by the germanium diode 327 in series with the low resistance 332. During the charging interval, diode 327 is in a conducting direction, and the current is partially shunted through this path. The circuit is overdamped at this time. When the voltage $E_2$ becomes negative, as during a pulse, the diode 327 is in a non-conducting direction. The coupling circuit is then arranged to be approximately critically damped. It should be pointed out, however, that the desired impedance conditions to minimize the positive peak of $E_2$ and maximize the negative peak already exist naturally, to some extent, in the transistor.

The branch of the circuit including the diodes 326—329 and the resistors 331—334 can be eliminated if the parameters of the chosen transistors are so characterized that when current is flowing in the collector circuit, the resistance looking back into this collector is relatively low, which condition limits the positive voltage appearing at $E_2$; and when the collector is cut off, as is the condition during a pulse, this collector presents a high resistance and allows a relatively high voltage to be built up across the tuned circuit.

As pointed out before, the resistor 336 is included as a stabilizing resistance to pad out the variation in the base resistance which results from the different internal constants of the transistors used. The loss in margin due to the positive voltage which is developed at $E_2$ during the charging interval amounts to about ten volts. Thus, the margin for false operation of other units due to this cause is reduced from twenty-five to about fifteen volts, which is still relatively large.

It has been found possible in operating this circuit to develop twenty-five volts at the base of each succeeding transistor. This results in the reduction of the peak voltage of the succeeding transistor, which it is desired to operate, by some ten to fifteen volts, which is a considerably higher margin than found in prior art circuits of a similar type.

The operation of this circuit can perhaps be more readily understood by examining the timing diagrams shown in Fig. 4. These are not exact pictures from an oscilloscope but are idealized to simplify the explanation of the circuit operation. The square-topped pulse timing is shown in the first diagram marked A; the next diagram, marked B, shows the corresponding collector current $I_1$. Curve C shows the effect of changes in collector current on the positive voltage, $E_1$, appearing across the tuned circuit in the collector. The collector current $I_2$ in the second transistor stage is shown by curve D. From a study of these curves one may see the manner in which the voltage $E_1$ behaves during the storage cycle. The way in which the negative voltage is generated during the pulse interval is also shown. It is apparent that the voltage at $E_1$, which causes the transfer of high-current conduction to the next stage, reaches its peak just when the pulses subsides and battery voltage is reestablished. Although the values of inductance and capacitance in the circuit are specified for a given pulse length, these values are not critical, since it is apparent that the voltage wave shape has a maximum with zero slope at the time the pulse subsides.

Figure 5:
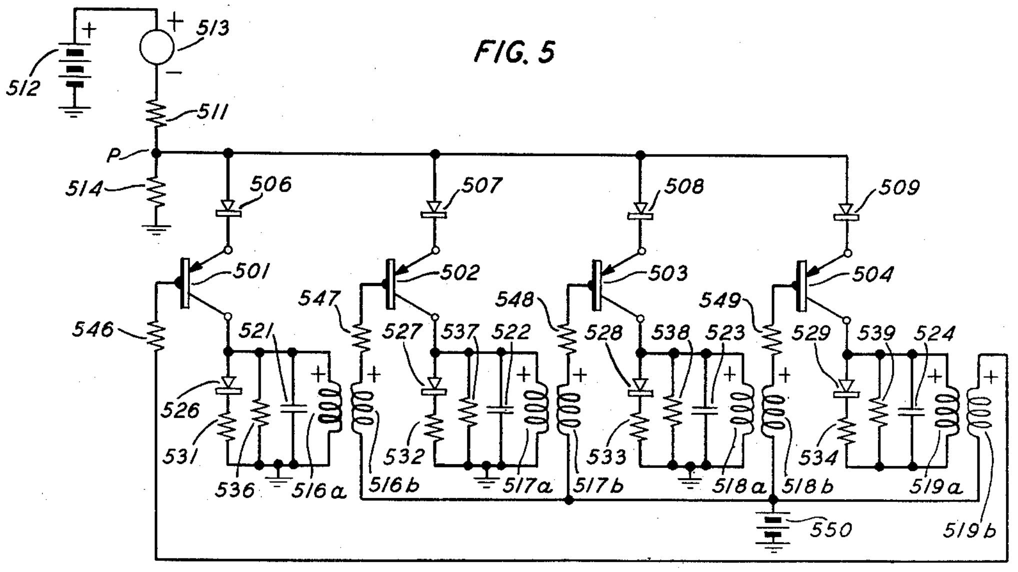
Fig. 5 is an alternative form of the ring circuit of the present invention, in which transformer couplings are used in the interstage storage circuits.

In the alternative circuit shown in Fig. 5 of the drawings, the only essential difference from the embodiment shown in Fig. 3 is the use of transformer coupling in the interstage storage circuits.

To simplify comparison, corresponding elements in the two circuits are similarly numbered. Thus, it is seen that the self-inductances 316 et cetera in the tuned circuit of the previous embodiment of Fig. 2 are replaced by the mutually coupled coils 516a—516b, 517a—517b, 518a—518b and 519a—519b, the primaries of which are connected across the respective condensers 521, 522, 523 and 524, and the secondaries of which are connected between the base circuits in the respective stages and the common positive terminal of the biasing battery 550. In the present embodiment, the latter battery has an electromotive force of about 40 volts. It is noted also that the respective connecting resistors between each of the base circuits and the common positive terminal point of potential sources 512 and 513 which were present in the previously-described embodiment, are here omitted. As previously described, the potential of source 512 and values of resistors 511 and 514 are such as to give an open circuit condition at point P of a source having thirty-five volts direct-current potential and 10,000 ohms internal resistance.

It is apparent that practice of the present invention is not limited to the specific circuit forms or values of components described herein by way of illustration.

What is claimed is:

1. An electrical counter circuit comprising in combination a plurality of variable resistance elements each of which has a variational resistance characteristic including a predetermined range of electrical quantities within which either of two stable states obtains for a given operating condition and outside of which range only a single stable state obtains for a given condition of operation, an external network connected across said paths, said network including an electrical potential source, the magnitude of which when so connected is sufficient to give rise simultaneously to values within said predetermined range of electrical quantities for all of said variable resistance elements whereby one of said elements operates in one of said stable states conducting high current and the remaining ones of said elements operate in the other of said stable states conducting low current, means comprising a generator of intermittent electrical pulses to momentarily change the effective value of said electrical potential source, and an energy storage impedance circuit interconnecting each pair of said current-conductive paths and including means for discriminating between the direction of current flow in said impedance circuit, said storage circuit characterized by a condition approximating critical damping, whereby a condition of high-current conduction is shifted from one of said variable resistance elements to the next by means of a broad damped pulse produced in said storage circuit.

2. An electrical counting circuit comprising in combination a plurality of transistors connected in tandem, each said transistor comprising a semiconductor body, a base electrode, an emitter electrode, and a collector electrode in operative contact with said body, a common external network connected to a first one of said electrodes in each of said transistors, said network including a source of potential for simultaneously biasing all of said transistors to values within an unstable region of their current-voltage characteristics in which a state of high-current conduction obtains in one of the transistors of said plurality and a state of low-current conduction obtains in the other transistors of said plurality, pulsing means for periodically varying the potential of said source, a coupling circuit connected between a second electrode in each said transistor and a third electrode in the next adjacent transistor, said coupling circuit characterized by a condition approximating critical damping whereby a condition of high-current conduction is shifted from one transistor to the next adjacent transistor by means of a broad damped pulse produced in the storage circuit of the high-current conduction transistor in response to a pulse from said pulsing means.

3. An electrical counting circuit in accordance with claim 2 in which said coupling circuit comprises a capacitor and inductor in parallel connection.

4. An electrical circuit in accordance with claim 3 in which said coupling circuit includes resistance in parallel with said capacitor and said inductor, said resistance being so related to the values of inductance and capacitance in said coupling circuit as to produce approximately critical damping therein.

5. An electrical counting circuit in accordance with claim 4 in which said pulsing means produces a substantially rectangular pulse having a width approximating $\sqrt{LC}$ where L represents the inductance of said coupling circuit and C represents the capacitance of said coupling circuit.

6. An electrical counting circuit in accordance with claim 2 in which said coupling circuit includes a unidirectional current-conducting element in parallel with said capacitor and inductor in parallel connection, said element presenting a low resistance shunt across said coupling circuit during the charging period of said condenser, and a high resistance across said coupling circuit during said discharging period.

7. An electrical counting circuit comprising in combination a plurality of transistors connected in tandem, each said transistor comprising a semiconductor body, a base electrode, an emitter electrode, and a collector electrode in operative contact with said body, a common external network connected to said emitter electrode in each of said transistors, said network including a source of potential for simultaneously biasing all of said transistors to values within an unstable region of their current-voltage characteristics in which a state of high-current conduction obtains in one of the transistors of said plurality, and a state of low-current conduction obtains in the other transistors of said plurality, pulsing means for periodically varying the potential of said source, a coupling circuit connected between said base electrode in each said transistor and the collector electrode in the next adjacent transistor, said coupling circuit having a damping which is approximately critical damping producing a voltage pulse which reaches its maximum value approximately when the pulse from said pulsing means subsides, whereby a condition of high-current conduction is shifted from one transistor to the next adjacent transistor by means of said damped voltage pulse produced in the coupling circuit of the high current conduction transistor in response to a pulse from said pulsing means.

8. An electrical counting circuit comprising in combination a plurality of transistors connected in tandem, each said transistor comprising a semiconductor body, a base electrode, an emitter electrode, and a collector electrode in operative contact with said body, each of said transistors operative with a current gain which is substantially greater than unity, and a common external circuit connected to said emitter electrode in each of said transistors, said network including a source of potential for simultaneously biasing all of said transistors to values within an unstable region of their current-voltage characteristics in which a state of high-current conduction obtains in one of the transistors of said plurality and a state of low-current conduction obtains in the other transistors of said plurality, pulsing means for periodically varying the potential of said source, a coupling circuit connected between said base electrode in each said transistor and the collector electrode in the next adjacent transistor, said coupling circuit having a damping that is approximately critical damping, producing a voltage pulse which approximately reaches its negative peak at the time each pulse from said pulsing means subsides whereby a condition of high-current conduction is shifted from one transistor to the next adjacent transistor by means of said damped voltage pulse produced in the coupling circuit of the high-current conduction transistor in response to a pulse from said pulsing means.

9. An electrical counter circuit comprising in combination a plurality of transistors each comprising a semiconducting body, an emitter electrode, a collector electrode, and a base electrode in contact with said body, said emitter electrodes connected together to a circuit comprising a common source of direct-current biasing potential and a resistor in series with said source, said source and said resistor valued to bias said transistors within a predetermined range of electrical quantities within which either of two stable current-conduction states obtains for a given operating condition and outside of which only a single stable state of current conduction obtains for a given condition of operation, whereby one of said transistors operates in the higher of said current-conducting states and the remainder of said transistors operate in the lower of said current-conducting states, means comprising a generator of electrical pulses to momentarily change the effective value of said electrical potential source to give rise momentarily to quantities outside of said predetermined range whereby all of said elements operate in the same stable state, an energy storage impedance circuit connected between the collector electrode in each of said transistors and the base electrode in the next adjacent transistor, each said storage circuit including a circuit broadly tuned with relation to the pulses of the generator of electrical pulses, and a resistance element for producing approximately critical damping in said storage circuit.

10. An electrical counter circuit in accordance with claim 9 in which said tuned circuit includes an inductor in parallel with a capacitor, and means in parallel with said inductor and said capacitor presenting a low resistance in the direction of current flow from said collector during the charging of said capacitor, and a high resistance in the direction of discharge of said capacitor, and means including said last-named means for providing approximately critical damping in said tuned circuit.

MILTON E. MOHR.

No references cited.